United States Patent [19]

Crose

[11] 4,109,027
[45] Aug. 22, 1978

[54] ELECTROSTATIC COATING APPARATUS AND METHOD

[75] Inventor: James R. Crose, Chelmsford, Mass.

[73] Assignee: W. R. Grace & Co., Cambridge, Mass.

[21] Appl. No.: 651,162

[22] Filed: Jan. 21, 1976

[51] Int. Cl.² .......................... B05D 1/06; B05B 5/02
[52] U.S. Cl. ..................................... 427/28; 118/621; 118/622; 118/627; 222/195; 239/3; 361/226; 427/27; 427/33
[58] Field of Search .................. 427/28, 33, 27, 29, 427/71, 105, 106; 118/622, 621, 627; 317/3; 239/15, 3; 222/195; 361/226, 227

[56] References Cited

U.S. PATENT DOCUMENTS

| | | | |
|---|---|---|---|
| 2,538,562 | 1/1951 | Gustin et al. | 427/28 |
| 3,121,593 | 2/1964 | McIlvaine | 222/195 X |
| 3,248,606 | 4/1966 | Fraser | 317/3 |
| 3,446,642 | 5/1969 | Webb | 427/185 |
| 3,513,011 | 5/1970 | Miller | 427/28 |
| 3,540,653 | 11/1970 | Fabre | 239/15 |
| 3,546,017 | 12/1970 | Pendleton et al. | 427/32 |
| 3,659,151 | 4/1972 | Fabre | 317/3 |
| 3,850,659 | 11/1974 | Barnes | 427/33 |
| 3,904,930 | 9/1975 | Waldron et al. | 427/28 X |
| 3,914,461 | 10/1975 | Goodridge | 427/33 |
| 3,922,213 | 11/1975 | Smith et al. | 204/181 |

OTHER PUBLICATIONS

SME Technical Paper FC 73-521 (1973), "Electrogasdynamic Powder Coating Tunnel," Meredith C. Gourdine, Gourdine Systems Inc.

Primary Examiner—Ronald H. Smith
Assistant Examiner—Stuart D. Frenkel
Attorney, Agent, or Firm—Lowell H. McCarter; C. Edward Parker

[57] ABSTRACT

Disclosed is an electrostatic coating device and method employing highly charged particles that are charged remote from the articles to be coated and then delivered to an area where they are to be applied by conveying them in a moving air stream. The movement is stopped by closing off the air stream, suspending the particles in space. Thereafter the particles are applied to an article by electrostatics. Special components are a powder entraining device which uses air fed at the bottom to erode the powder, feeds additional air from above and removes entrained powder from below; a charging device using the reaction of two converging opposed vortexes to oscillate the powder turbulently through an isolated high voltage electrical zone; and a multiple valve that feeds the charged powder to a can and vents the can, then isolates the can, bypassing the powder.

13 Claims, 4 Drawing Figures

ELECTROSTATIC COATING APPARATUS AND METHOD

The valve of the present application is further described in U.S. Pat. No. 3,995,586 filed on the same date as this application, and divisional application U.S. Pat. No. 4,025,660.

SUMMARY OF THE INVENTION

The invention relates to electrostatic coating and to apparatus and methods for enhancing such coating and the handling of powders and charging of particles therefore.

By an aspect of the invention an electrostatic powder deposition method is provided which involves supplying a like charge to the particles of powder, injecting the charged powder into an enclosure having an open volume therein bounded by at least one wall, sealing the enclosure with substantially all of the powder in the open volume and thereafter depositing the powder on the wall due to the charge on the particles. The method preferably includes at least partially releasing air from the open volume prior to sealing the enclosure. In one form the charged medium is supplied to the area of the object to be coated through kinetic velocity which is substantially completely removed by the sealing of the enclosure and the deposition of the particles is by their movement, propelled at least in part by their repulsion from one another. The electrical potential of the open volume containing the particles and the different electrical potential on the wall provide for a superior deposition of the powder without an active electrical field generated in locus.

By another aspect of the invention an electrostatic charging device is provided which includes a chamber that has a throat with two opposed openings therefrom and two subchambers, one subchamber opening into a respective throat opening. An injection opening opens into each respective subchamber remote from the throat opening. Each injection opening opens at an opposite circular vortex terminus. The chamber has an ejection opening from one of the subchambers. A charge generating means is associated with the chamber. The charge generating means is preferably high voltage, receiving more than 50,000 volts.

In one preferred form an electrode extends through the chamber on its longitudinal axis and when energized provides corona throughout the chamber.

By yet another aspect of the invention a method of electrostaticaly charging matter and of treating particulate matter is provided which includes entraining matter in particulate form in a gas stream, sending the gas stream with the entrained particles in a vortex path into an ionization zone, intersecting the vortex path with a gas stream with an opposed vortex and causing a pulsing of the gas streams.

By still another aspect of the invention a particularly advantageous method of coating articles is provided involving selecting dielectric particles having average diameters of 2–30 microns, charging the particles and applying the charged particles to an article through charge repulsion of the particles one from the other. The particles are preferably charged remote from the article to be coated with no electrical field existant between the area where the particles are charged and the article to be coated.

In still another aspect of the invention a method and apparatus is provided for entraining powders in gas. A body of powder is positioned above a gas source and within a housing, preferably on a downwardly pointing porous cone. An opening is provided in the housing preferably at the apex of the cone. The opening has a lower gas pressure than the gas pressure in the housing. Gas is fed under pressure into the body of powder from the source below the body of the powder. A greater quantity of gas at a lower pressure is supplied above the body of powder. The gas is allowed to escape through the opening having the lower pressure.

As used in the present application, particles can be solid matter, drops of liquid or solid matter and liquid. By kinetic velocity it is meant the movement of the particles by the air's flow or by an inertia of its own movement.

PREFERRED EMBODIMENT

Figure 1:
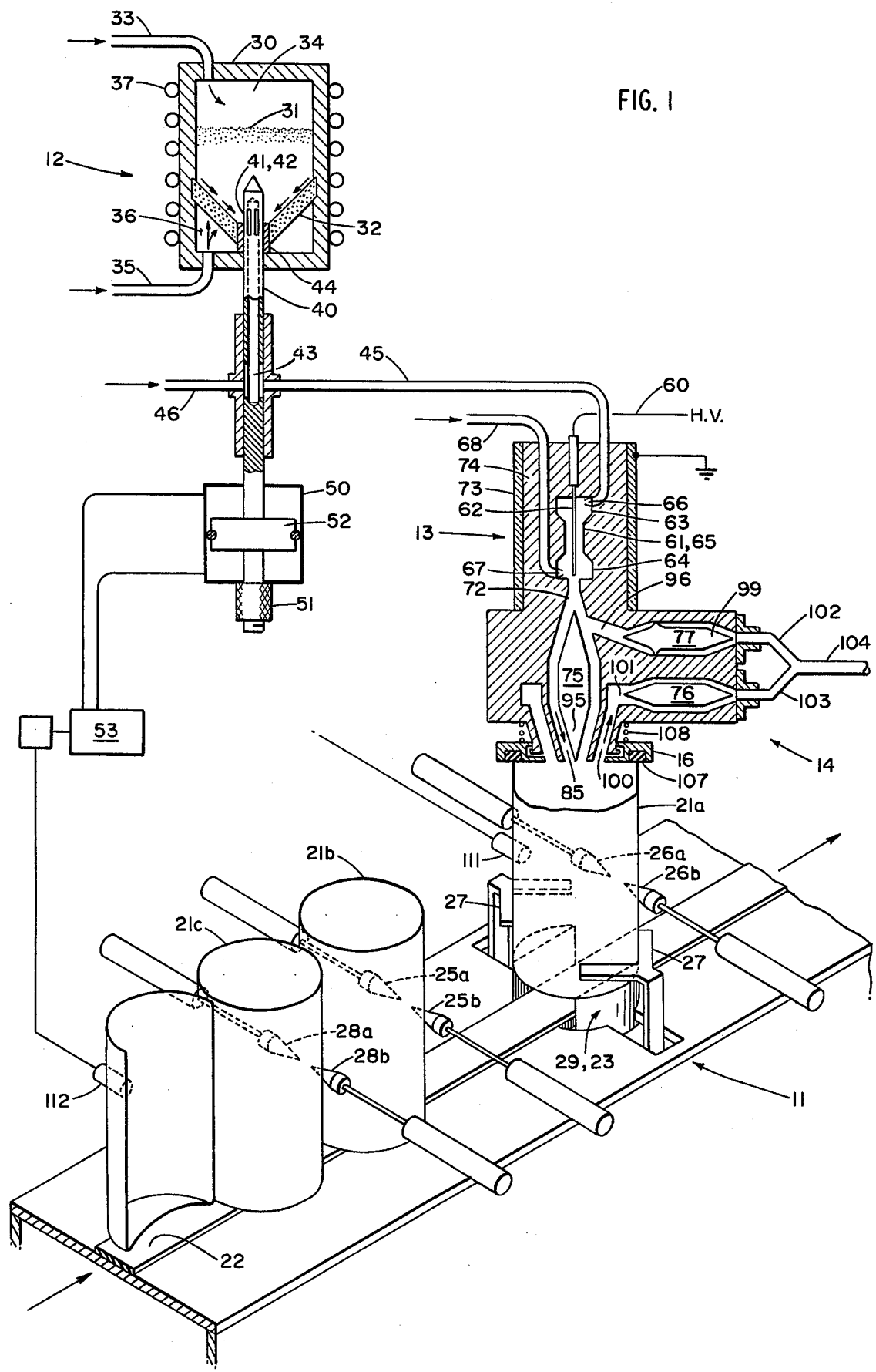
FIG. 1 is a perspective view of the electrostatic coating apparatus.

Referring to FIG. 1 of the drawings, an apparatus 11 is shown which expeditiously applies a substantially uniform coating of charged powder to the inside walls of a can. The apparatus in its basic components includes an air entraining powder feeder 12, a powder charging device 13, a multiple valve assembly 14 and a can masking head 16 for sealing the can during application of the powder.

The cans 21a, b, and c are conveyed to the powder coating station or position 23 by conveying means 22 which operates continuously. The cans are intermittently fed into the powder coating station 23 by operation of gate means 25a and 25b. The gate means engage a can from both sides retracting on signal to allow the conveyor to move the can to the powder coating station 23. The can is stopped in the powder coating station by gate means 26a and 26b. Split lifting chuck 29 straddles the conveyor 22 and lifts the can toward the masking head 16. Centering fingers 27 assure that the can is centered with the head 16. To assist in orderly feeding, gate means 28a and 28b stop the line of infed cans ahead of gate means 25a and 25b. After release from the powder coating station the cans are delivered by the conveyor 22 to an oven (not shown) for firing or to a collecting station for transfer in batches to the oven. The firing fuses the powder to form an integral unitary coating.

Continuing to refer to FIG. 1, the device 11 will be described in greater detail. The air entraining powder feeder 12, has a pressure housing 30 which contains a body of powder 31. The powder rests on a porous cone 32 which is positioned in a lower portion of the housing 30. A primary pressurized air feeding duct 33 enters an upper region of the housing 30 and opens into an air space 34 above the powder 31. A second pressurized air duct 35 enters a plenum chamber 36 formed by the space below the porous cone 32. The pressurized air fed to the plenum chamber 36 should have a higher pressure than the air fed to the space 34, maintaining the air in the plenum chamber at a higher pressure than the air in the space or chamber 34. A temperature control capability is provided by the cooling jacket 37 which, encircles the pressure housing 30.

Feeder discharge tube 40 enters the powder feeder 12 through the convergence point of the cone 32. Elongated ports 41 open into a central channel 42 extending through the central stem of the powder discharge tube 40 to an exit port 43. The powder discharge tube 40 is received in sleeve 44 for axial movement into and withdrawal from penetration of the powder body 31. This permits expeditious metering of the quantity of powder withdrawn and provides a shut-off capability. The air from the plenum chamber passes through the porous cone and acts to erode the base of the powder body 31 as it passes down to the convergence point and into the ports 41. The air in chamber 30 passes down through the powder and also enters the ports 41.

Port 43 passes all the way through the feeder discharge tube 40 and is aligned with the powder transmission line 45 that carries the powder/air mixture away. Air line 46 supplies additional air to the powder transmission line 45 to adjust the velocity of the powder once the mass flow rate of the powder has been established.

A powder flow regulating and shut-off assembly 50 may be seen at the outer end of the central stem of the feeder discharge tube 40. This assembly 50 contains metering knob 51 which axially moves the ports 41 into and out of the sleeve 44 to adjust the ports openings and thereby control the amount of air entrained powder admitted through the ports. The piston 52 reciprocates between the two positions to completely shut off the ports 41 or open them to their preset metered opening in response to the shunting of air across the piston by an air valve 53. Port 43 is elongated so that the stroke of the piston will not result in its closing. The powder transmission line 45 is made from a material whose triboelectric properties enhance the static charge being received by the powder and is compatible with the polarity of the charging device 13.

The charging device 13 has a high-voltage supply line 60, a charging cavity 61 and an electrode 62. Cavity 61 has end bells 63 and 64 which are separated by a throat 65. Powder transmission line 45 communicates with end bell 63 through port 66. The electrode 62 passes through the charging cavity 61 on the cavities longitudinal axis. A balancing air supply line 68 communicates with end bell 64 through port 67. The charging device 13 is enclosed within a grounding shell 73 which is filled with a cast dielectric insulating medium 74.

Figure 4:
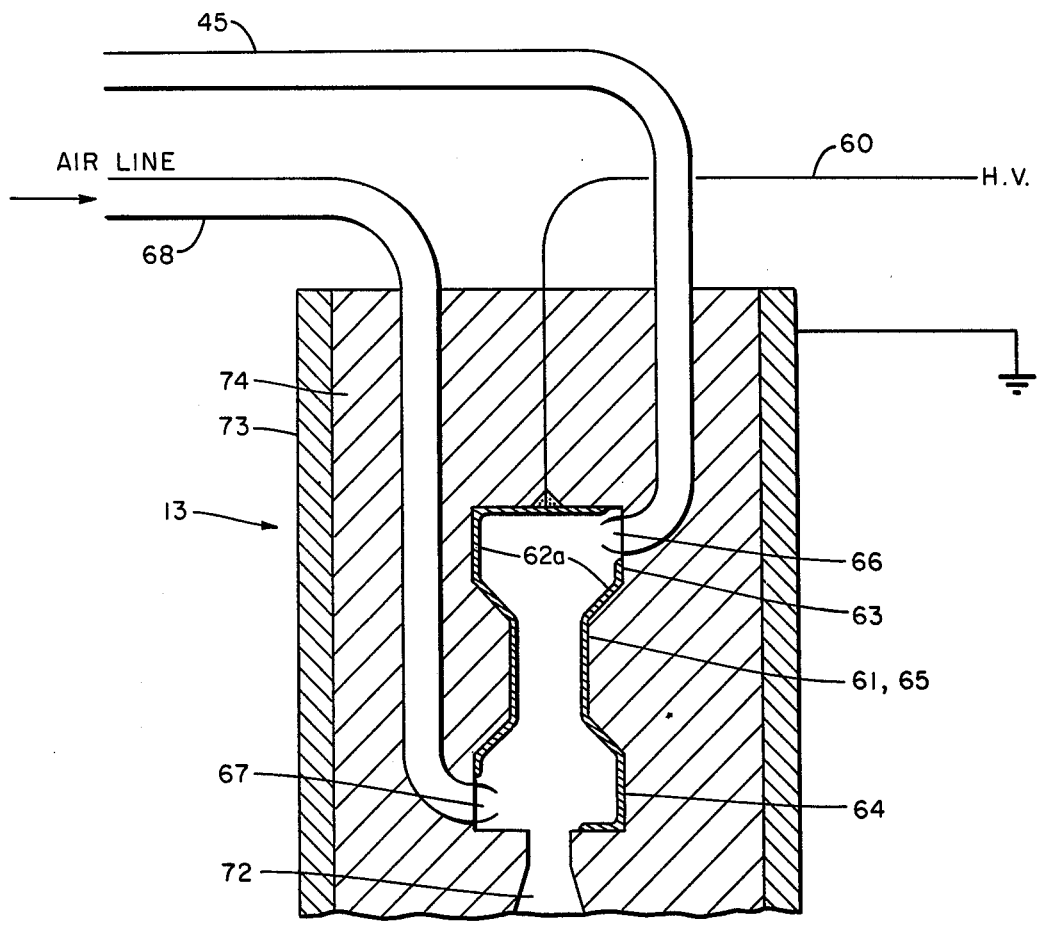
FIG. 4 is an exploded view showing another embodiment of the charging cavity having the walls thereof coated with a conductive medium.

In the embodiment shown in FIG. 4 the electrode 62 may be eliminated by replacing or providing the dielectric insulating medium 74 with a layer of a conductive medium 62a on at least one wall of the cavity 61 and connecting the high voltage line 60 to the conductive medium cavity wall. The particles then become charged upon contact with the charged cavity wall 61.

Figure 2:
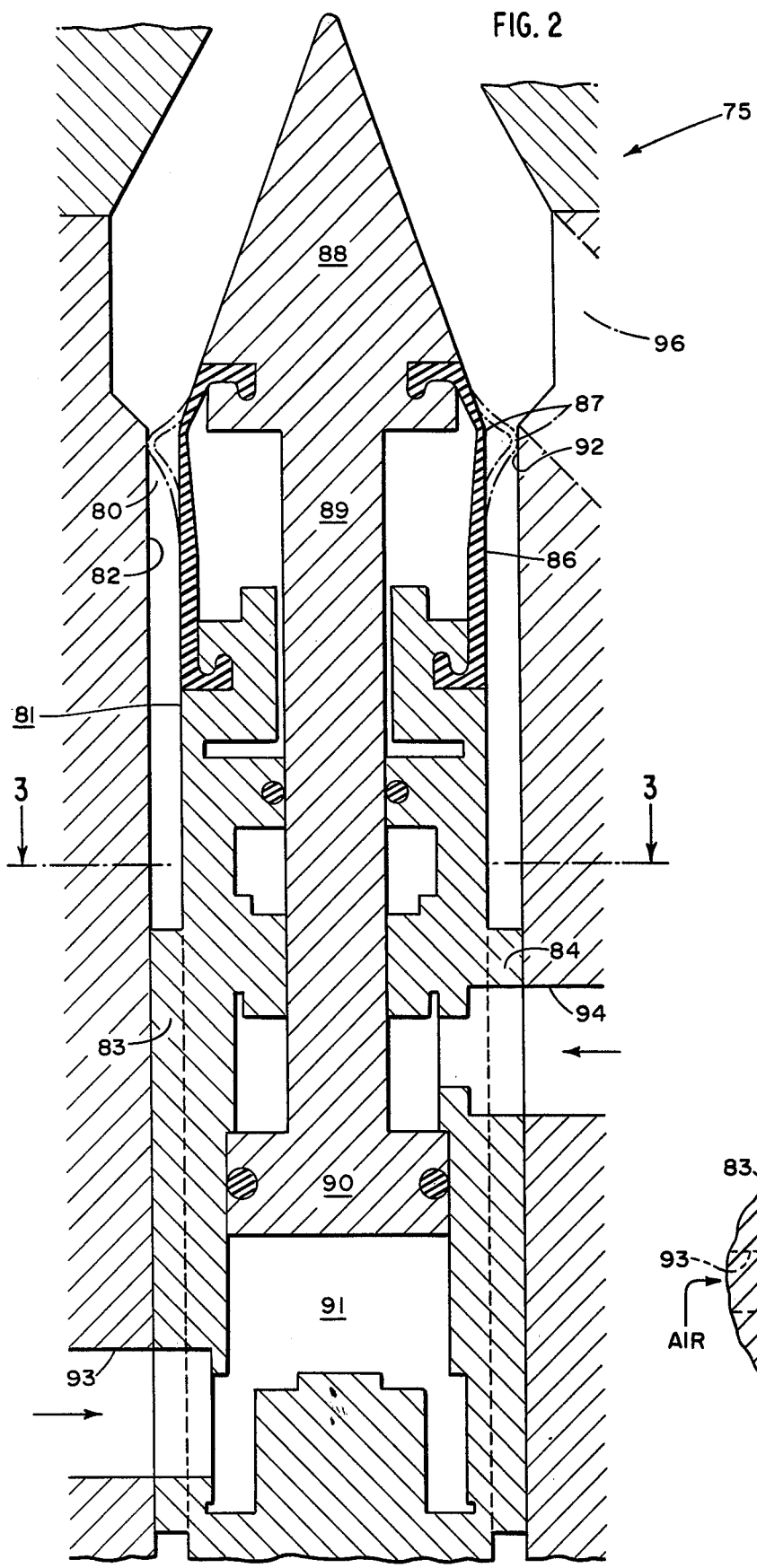
FIG. 2 is a vertical section view of the supply valve unit.
Figure 3:
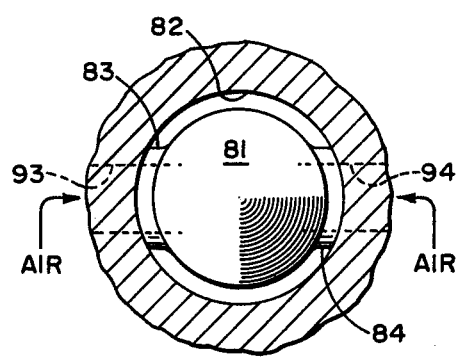
FIG. 3 is a horizontal cross-sectional view taken along the line 3—3 of FIG. 2.

The exit 72 communicates with the multiple valve assembly 14. The multiple valve 14 includes three valve units: Supply valve unit 75, vent valve unit 76 and bypass valve unit 77. Referring next in particular to FIGS. 2 and 3, the supply valve unit 75 may be seen to include an enlarged passageway 80 which includes a torpedo shaped housing 81 which is centered with respect to cylindrical wall 82 of the passageway 80. By torpedo shaped housing it is meant an elongated body with relatively cone shaped outer ends. Preferably the cones are elongated and the outer exposed surfaces of the housing are substantially evenly spaced from a central axis extending through the body of the housing to the outer apexes of the cones.

The housing 81 is connected via two struts, 83 and 84, to the cylindrical wall 82. The housing 81 is placed medially and axially within the enlarged passageway 80 and is sized, with the struts 83 and 84 included, so that the cross sectional flow area of the passageway remains substantially constant with the unobstructed passageway 72. The passageway 80 is shaped aerodynamically to minimize powder air entrainment and turbulance. There is a clean smooth cone shaped flow transition both in the enlargement of the passageway from the dimension of the unobstructed passageway 72 and the diminution of the passageway to the outlet port 85.

The valving unit 75 further includes a sealing element or diaphragm 86 mounted at one end of the housing 81. The diaphragm 86 is a deflectable elastomeric sleeve provided with a hinged area 87 that is tailored and thinned to achieve the flextured expansion of the diaphragm diameter at the desired region. The diaphragm 86 is secured at its outer end by the clamping engagement of the nose cone 88 and at its base by being clamped within the body of the housing 81. The diaphragm is aligned with the walls of the housing 81 when the valve 75 is open so as to provide the smooth cone shaped flow transition at the enlargement end of the housing and valve passageway. The nose cone 88 is connected to the stem 89 of a piston 90 which reciprocates within the air cylinder 91 to close the diaphragm 86 against the outer cylindrical wall 82 at the seat region 92 of the enlarged supply line 80. An air valve (not shown) switches the air between air inlets 93 and 94 to reciprocate the piston and thereby opening and closing the passageway 80 to powder/air flow.

The diaphragm 86 is preferably composed of an elastomeric material and more preferably silicon rubber. The material resists erosion from the powder, seals over particulate material which is always present because of the air entrained powder carried through the valve. The cross-sectional dimension of the diaphragm provides adequate sealing pressure, resistance to deformation by the pressurized air in the passage 72, and long cycle life and produces no obstruction to flow during the diaphragms' relaxed or open state. The diaphragm provides a line seal with its outward deflection against the wall 82.

Referring to FIG. 1 as well as FIG. 2, the multiple valve assembly 14 has port 96 exiting from enlarged passageway 80 just upstream of the annular seat region 92. Port 96 communicates with the bypass valve unit 77 which has the same construction as the supply valve unit 75 with the exception that the tail cone 95 of the supply valve unit may be blunted or elongated compared to the tail cone 99 of the bypass valve unit 77. The tail cone 95 is configured to fit the nozzle requirements for dispensing the powder into a can of a given shape and size. Tail cone 99 is proportioned to give the smoothest possible flow transition on the exhaust side of the enlarged passageway.

The vent valve 76 is identical to the valve unit 77 and vents the air from the can 21a. The air passes from the can 21a through the annular vent passageway 100 entering the valve unit 76 flow passageway through the port 101. The exit ports from the valves 76 and 77 are so sized that the flow capacitance through both branches of the multiple valve 14 will be equalized. Port 102 exits the bypass valve 77. The ports 102 and 103 feed into a common manifold 104 which may feed to an additional valve assembly identical to valve assembly 14, if two valve assemblies are to be used in tandum or to a filter means which would collect any unused powder for recycle or other disposition.

Several features of the apparatus have not yet been mentioned. The masking head 16 has a gasket 107 that sealingly engages the rim of the can at the cans open end. The head 16 lifts against spring 108 to assure a positive seal. Signaling device 111 is interlocked with the controls of the multiple valve 14 and prevents the valve 77 from closing and valves 75 and 76 from being open when a can is not in the loading station. Signaling device 112 is connected to control 50 and shuts off the powder by causing the piston 52 to be moved drawing the ports 41 into the sleeve 44.

Turning now to the operation of the invention in one preferred form thereof. With valve 50 closed, a body of powder is loaded into the feeder 12 and the feeder is sealed and thereafter pressurized by cutting on the air to airlines 33 and 35. Power is supplied to the apparatus 11 including the high voltage line 60. Conveyor 22 advances the cans toward the loading station 23 activating the sensor 111 which opens airline 68 supplying air to the powder charging device 13. The sensor 111 also opens valve 50 by moving feeder discharge tube 40 upwardly into the body of powder opening the ports 41. Powder entrained in air flows into the central channel 42, feeder discharge tube 40, through exit port 43 and through the powder transmission line 45 into the powder charging device 13 and forms a vortex circulation in the end bell chamber 63 of the charging device progressing from its point of entry to the throat 65. The incoming air in the airline 68 forms an opposite vortex circulation in the end bell chamber 61 of the charging device 13 progressing from its point of entry 67 to the throat 65. When the two vortexes engage they begin oscillating in the throat causing a pulsing discharge of the entrained powder from the charging device 13 and through the exit 72 and into the multiple valve 14.

The air and entrained powder passes into the upstream end of passageway 80 where it is shunted back and forth between feed valve 75 and bypass valve 77 by the cycling of the apparatus 11. The sequencing is with any of the well known electromechanical programable components which cycle continuously as set so long as sensor 111 continues to signal that a can is in position when it is time to open valves 75 and 76 and close valve 77.

The cans are released by gate means 28*a* and *b* to gate means 25*a* and *b* and operates in timed sequence therewith. The cans are then released in time sequence and moved by the conveyor 22 to gate means 26*a* and *b*. Chuck 29 lifts the can with the fingers 27 centering the can in timed sequence into engagement with gasket 107. The multiple valve sequences to open valve 75 and close valve 77. Vent valve 76 is timed to open with valve 75.

There is then a time delay set for a particular can size and type so that the powder and air passing through the supply valve 75 and the outlet port or nozzle 85 into the can 21*a* can displace the air within the can 21*a* out vent 100 until the approximate circumstance wherein the powder entrained air has filled the can 21*a* and reached vent 100. At this time the vent valve 76 and the supply valve 75 close and the bypass valve 77 opens. It will be understood that at this time the can is part of an enclosed suspension in communication with the valve 75 downstream of the valve seat 92 and with the valve 76 upstream of the valve seat of that valve. The kinetic energy of the entrained powder is substantially dissipated when the air's passage is stopped. This seems to substantially eliminate the influence the velocity of the powder had on entering the can and the eddy currents in the air's movements. This is particularly important in coating difficult areas in a can uniformly. This allows the initial charge on the powder to drive the powder to the sides of the can. The can which is at a lower voltage potential accepts the powder driven outwardly to the sides of the can by the space charge formed by like charged particles. The can need not be grounded.

After the timed period set for a particular can, the chuck 29 and the fingers 27 reverse their motion to return the can 21*a* to the conveyor 22. The gate means 26*a* and *b* open and the can 21*a* is conveyed to either a collection station or to a subsequent treatment station such as into an oven (not shown) for fusing the powder. The second can 21*b* is released by the gate 25*a* and *b* as the gate 26*a* and *b* release can 21*a*. After can 21*a* has had time to clear gate 26*a* and *b* gate 26*a* and *b* closes to hold can 21*b* and the sequence previously described respecting the raising and positioning of can 21*a* and the powder coating and release thereof is repeated. The second can 21*c* was released by gate 28*a* and *b* to gate 25*a* and *b* at the time the chuck 29 began to raise the can 21*a*. When the last can on the conveyor 22 passes sensoring means 112 the absence of another can is sensed and valve 50 switches off the powder flow. The valve 75 remains closed as the last can clears the loading station as sensed by sensor 111.

SPECIAL FEATURES AND LIMITATIONS

A timed purge cycle is provided through line 46 to purge the system of any powder at such time as the system is shut down for any reason and the purge air goes through the bypass valve 77 to the filter. The bypass valve is always open when the supply valve 75 is closed.

The valves 75 and 76 and the valve 77 open and close in balance so that the flow of the air and air entrained powder is not made unnecessarily turbulent. In other words this means the same volume of air and entrained powder passes through port 72 at all times; A pertinacious constant flow is maintained through the multiple valve 14.

A sufficiently short cycle time should be selected to prevent powder from escaping out the vent 76. The quantity of the powder supplied to a can is regulated by the control mechanism 50 through the fine adjustment of knob 51 which raises and lowers the length of the ports 41 exposed above the sleeve 44. The adjustments are made on the basis of visual inspection and by weighing the can to assure the required total quantity of powder is supplied. Should the velocity requirements in the can 21*a* not be met additional air is supplied through the makeup line 46 to adjust the velocity. The adjustment of the velocity of the air is done on the basis of the visual appearance of the powder placement within the can. At all times the velocity is held to a minimum commensurate with getting a sufficient supply of powder into the can. Threshold (minimum) velocity is dictated by the precipitation of the powder out of the air stream. Suction stations may be provided adjacent to the masking head 16 to compensate for mis-alignment of a can. One of the important features of the system is the fact that it is a self contained system and no powder is sprayed into the surrounding ambient except during a malfunction.

In a desirable and preferred embodiment a second multiple valve 14 is connected in series so that the bypass valve and the vent valve feed through line 104 into the second valve's port 72. The second multiple valve operates in the same manner as the multiple valve just described. Cans are fed to the second valve in the same manner already described for the first multiple valve. The two valves would be alternated so that no powder would need to be lost through the second valve through the valves bypass. Thus only the air exhausted from the can would be vented through the vent valve during cycling of the equipment. In any preferred embodiment there would be a collector and filter at the exit from the last multiple valve to collect any escaping powder and preferably such powder would be recycled to the powder feeder 12. Of course, in proper circumstances other component parts can be substituted for the ones described in detail in the presently preferred embodiment. For example other powder feeder devices then the device 12 may be chosen. Furthermore the sequencing of the device may be varied advantageously in proper circumstances. For example it may be desirable in some uses of the device when coating cans to slightly delay the closing of the vent valve 76 after the closing of valve 75 to properly vent the can.

It has been discovered surprisingly that very small particles give the best coating results. This is particularly true with heat fusable epoxy based powders and the most preferred epoxy phenolic powder. The preferred particles size is 2-30 microns, more preferably 5-20 and most preferably 7-12 microns. These are the average micron readings on a powder. For example, in a particular preferred powder the Coulter counter analysis showed a distribution of particle sizes in a powder having an average particle size of 5.2 microns with a distribution of 3-20 microns with the bulk of the powder being 3-8 microns.

It is believed that because the system of this invention operates through a space charge effect rather than a field effect, the small particles, which carry a smaller charge than the larger particles, can fit closer together on the wall of the can. The smaller charge means that the particles have a weaker repulsion on one another. In addition the smaller particles within the average particle mix have greater mobility. The more mobile particles are apparently driven to the substrate first. They are repulsed by the more highly charged larger particles which are less mobile and constitute the middle of the space charge as it expands outwardly. As the powder expands outwardly in the final analysis the largest particles also repell one another until they too bump into the surface of the can which stops them. This is also enhanced by the fact that the charge received by particles adjacent to the electrode 62 is higher than one in the outer area of the throat or the bell which has a less intense field. The charge impressed on a particle is related to field intensity at the time the charge was placed on the particle within the charging cavity. Furthermore the powder's charge is enhanced due to the increased residence time and turbulence caused by the oscillations as the powder recirculates back and forth in the powder charging device prior to the pulsing discharge, forcefully ejecting powder into the port 72. It should be noted that it is usually difficult to provide a grounding of the can because the cans are lacquer or paint coated on the exterior surfaces which acts as an insulator. The can is all the same the sink serving to attract the particles having the higher charge potential to its wall. It may be advantageous in proper circumstances to ground the can, enhancing the potential differences and increasing the contribution of the difference in potential to the even coating of the can. It should be understood that the only operational fields in the present electrostatic deposition are the powder to powder and powder to wall fields.

A surprising and unexpected occurrence is the observation of multiple layers on the can walls more than one particle thick when the particles all have the same charge. The amount of powder to be deposited depends on the desired protection, the kind of powder and the uniformity of the coating.

It may be observed that in the charging device 13 the electrical field is established between the grounded sleeve 73 and the electrode 62 and the powder is retained in the chamber all parts of which are relatively close to the electrode. Furthermore because of the isolation of the electrode very high voltages may be used. Furthermore because the powder is preferably fed into the symmetrical end bell 63 remote from the ejection port 72 the powder has a longer retention experience in the charging device's cavity. All of this contributes to obtaining very highly charged particles.

A preferred method for handling powders that have a softened characteristic at the conditions of their normal ambient of use is to cool the particles to a degree substantially reducing softness. Many powders in ordinary use would benefit from being cooled to $-10°$ to $-30°$ F for optimum performance. When the powders are to be air or gas entrained it is perferable to also refrigerate the gas or air to this temperature to assure that the powder leaving the feeder 12 will be at this temperature. It is preferable to precool any large amount of powder before loading the feeder 12 and then the feeder cooling coil 37 can be operated at $-30°$ to $-10°$ F to maintain the powder's temperature. The greater quantity of the air supplied to the air entraining powder feeder 12 is preferably supplied from above the powder via line 33, which has the lower pressure, rather than from below the powder through the plenum chamber 36.

The electrical charging device 13 of this invention, through its unique operation, provides a very highly charged powder and works within the overall apparatus to apply this powder expeditiously. The charging chamber is completely enclosed in the dielectric material 74 which is encased in a grounded housing 73. Thus a very high voltage (100,000 volts) can be supplied to the electrode 62. The charging device must overcome the original electrostatic (triboelectric) charges that exits on the powder particles prior to entering the charging cavity if it is not the same as the one to be supplied. A particular advantage of the charging device of the present invention is its ability to break up or explode agglomerated powder particles to their individual manufactured sizes. The high voltage corona in combination with the turbulence of the charging device are very effective reducers of agglomerations in the powder.

Power retention within the charging device can be varied by changing the operating frequency. Particle exposure to continued ion bombardment is enhanced due to induced turbulence.

Not only can other valves and the like be substituted into the invention of this system in proper instances, other gases than air could obviously also be used. Furthermore by replacing the dielectric cavity wall with a conductive medium 62a (see FIG. 4) and electrifying the wall rather than using an electrode for corona charging the particles, the particles can be contact charged. In all other respects the gas and powder flow action within the cavity would be substantially the same.

Yet another modification to the charging device 13 is the provision of a porous member for the walls of the throat 65, a grounded sleeve of the same linear dimension as the throat encircling but spaced from the throat and an electrode 62; such that the powder is maintained within the cavity 61 but the corona and air can extend outwardly in an electric field to the grounded sleeve. There would thus be no interfering dielectric material as in the device shown in FIG. 1.

The means for positioning the cans to receive the powder are shown only for purposes of illustration and are not in and of themselves a part of the present invention. Any means for supplying the cans for receipt of the powder load would be sufficient. Also any means may be used for sequencing the valve, electrical, mechanical or electromechanical etc.

EXAMPLE

It has been determined in actual test operations that the device described as preferred, using an epoxy phenolic powder, PCL 403, which has an average particle size of about 12 microns, obtainable from the Dewey and Almy Chemical Division of W. R. Grace & Co., gave a thorough even coating of 350 milligrams of powder to a 12 oz. steel beverage can having a deep draw well around the rim as shown in FIG. 1. The apparatus used in some of the test did not cool the powder but did use dry air having a dew point of 20° F. The air pressure in the plenum chamber was about 60 psi fed at the rate of 20 cubic ft/hr and the air in the space 34 was 58 psi fed at the rate of 30 cubic ft/hr. The air pressure at port 67 and the air-powder pressure at port 66 is approximately 45 psi and balanced. The can's moat area seen in FIG. 1 extending around the bottom of the can, offered only a small clearance with the can's outside wall, and was thoroughly coated on all sides and its bottom surfaces and upper edges where the velocity of any gases or moving powders would cause eddy currents preventing even coating.

While in accordance with the patent statues, what is considered to be the preferred embodiment of the invention has been described, it will be obvious to those skilled in the art that numerous changes and modifications may be made therein without departing from the invention and it is therefore aimed in the appended claims to cover all such equivalent variations as fall within the true spirit and scope of the invention.

I claim:

1. An electrostatic powder deposition method comprising entraining particles of powder in gas; thereafter supplying a like charge to the particles of powder by feeding the gas entrained powder into a cylindrical chamber having two enlarged symmetrical bell subchambers and a narrower connecting throat all aligned on a longitudinal axis, and an ejection opening centered in the outer end of one of the enlarged bells on the longitudinal axis, and circulating the powder about an electrode that extends through the chamber on the chamber's longitudinal axis, the entrained powder being fed into the outer end of the enlarged bell not having the ejection opening along its outer cylindrical surface in a first vortex direction of rotation and toward the throat and additional gas being fed into the outer end of the opposite enlarged bell in a second vortex having a reverse direction of rotation and toward the throat, bringing about a reaction between the vortexes by causing them to come together causing oscillatory movement of the particles of the entrained powder, providing improved exposure to electrical charging and a pulsing of the entrained powder and gas out the ejection opening; thereafter injecting the charged powder into the enclosure having an open volume therein bounded by at least one wall; sealing the enclosure with substantially all of the powder in the open volume and thereafter depositing the powder on said wall due to the charge on the particles.

2. An electrostatic powder deposition method comprising entraining in air an epoxy phenolic powder having an average particle diameter of 2–30 microns by eroding the bottom of a body of said powder by placing the powder in a sealed chamber resting on a downwardly pointing porous cone having an outlet at its lower apex and forcing air through the porous cone which air escapes through the outlet eroding the powder down the cone and carrying the powder with it through the outlet and feeding additional air into the sealed chamber above the body of powder which air seeps through the body of powder and combines with the powder and air passing through the outlet, the air being forced through the porous cone having a higher pressure than the air fed into the sealed chamber above the body of powder which latter air is supplied in greater quantity; supplying a like charge to the particles of the entrained powder by feeding the entrained powder into a cylindrical chamber having two enlarged spaced apart symmetrical bell subchambers and a narrower connecting throat all aligned on a longitudinal axis, and an ejection opening centered in the outer end of one of the enlarged bells on the longitudinal axis, and circulating the entrained powder about an electrode that extends through the chamber on the chamber's longitudinal axis providing corona throughout the chamber, the entrained powder being fed into the outer end of the enlarged bell not having the ejection opening and along its outer cylindrical surface in a first vortex direction of rotation about the electrode and toward the throat through the corona, feeding air that is powder free into the outer end of the opposite enlarged bell in a second vortex having a reverse direction of rotation and toward the throat and forcing an oscillatory turbulent movement of the particles of the entrained powder by the reaction of the coming together of the vortexes, providing improved exposure to the corona with individual particles having different retention periods in the corona and different experiences with distances from the electrode; pulsing the charged entrained powder out the ejection opening and feeding a multiple valve, the multiple valve having a supply valving unit, a bypass valving unit and a vent valving unit; forming an enclosure by biasingly engaging a mask against the rim of a can with the inside wall area of the can including at least one wall; injecting the charged entrained powder into the open volume of the enclosure by the opening of the supply valving unit and the synchronized closing of the bypass valving unit; releasing the air in said open volume through the vent valving unit of the multiple valve; sealing the enclosure with substantially all of the powder in the open volume by closing the supply valving unit and the vent valving unit; and thereafter depositing the powder on said wall due to the charge on the particles; the charged entrainment powder being alternatley passed through the bypass valving unit or the supply valving unit in synchronized reversing unison maintaining substantially the same volume through the multiple valve at all times; and separating the can from the mask after the charged air entrained powder has been applied to the inside wall area of the can and the open space and air in the can is clear of powder and thereafter engaging another can with the mask and opening the supply and venting units and closing the bypass valve unit and depositing electrostatic powder on the inside wall area of another can.

3. An electrostatic charging device comprising a chamber, said chamber having a throat with two opposed openings therefrom and two subchambers, each subchamber opening into a respective throat opening; two injection openings into said chamber, one into each subchamber remote from the throat opening, each injection opening opening at an opposite circular vortex terminus, an ejection opening from one of said subchambers and a charge generating means associated with said chamber.

4. The electrostatic charging device of claim 3 wherein said throat is an elongated cylinder having a longitudinal axis and said throat openings are the rims of said cylinder and the subchambers are symmetrical bells that expand outwardly from the rim of said cylinder on the longitudinal axis thereof and have outer ends extending substantially perpendicularly to the longitudinal axis, the two injection openings opening into their respective subchambers opposite to one another and said ejection opening is medially through the center of the planar end wall of one of the subchambers.

5. The electrostatic charging device of claim 4 wherein the injection opening in said chamber containing said ejection opening is connected to a gas source that is substantially free of entrained powder and the other injection opening is connected to a gas entrained powder source and said charge generating means receives more than 50,000 volts and said chamber is completely enclosed in dielectric material which has a grounded housing completely around it in at least one dimension.

6. The electrostatic charging device of claim 4 wherein said charge generating means is an electrode which extends through the chamber on said longitudinal axis and when energized provides corona throughout the chamber.

7. The electrostatic charging device of claim 4 wherein at least one wall of the cavity is provided with a layer of a conductive medium which is connected to a high voltage line to provide a contact charge on particles that become engaged with said wall.

8. The electrostatic device of claim 6 wherein said electrode is connected to a high voltage line of at least 50,000 volts medially through the center of the planar wall of said chamber opposite said ejection opening.

9. A method of electrostatically charging matter comprising entraining said matter in particulate form in a gas stream, sending said gas stream with said entrained particles in a vortex path into an ionization zone, intersecting said vortex path with a gas stream with an opposed vortex, causing a pulsing of the gas streams and charging said particulate matter in said ionization zone.

10. The method of claim 9 comprising bombarding said particles with ions in said ionization zone.

11. The method of claim 9 comprising bringing said particles into contact with a charging source in said ionization zone.

12. The method of claim 9 comprising creating said vortex path for said gas stream with said entrained particles by injecting said gas stream with said entrained particles into one outer end of a chamber having a cylindrical throat terminating at each end in a symmetrical bell with the throat and bells aligned on a central axis, said gas stream with said entrained particles being injected into said symmetrical bell at an angle along a wall of the symmetrical bell in a first direction; said gas stream with said opposite vortex being created by injecting said gas stream into the outer end of the other symmetrical bell at an angle along a wall of the symmetrical bell in an opposite direction from said first direction; and said gas stream having said opposite vortex being substantially free of entrained particles.

13. The method of claim 9 wherein said method includes enclosing said vortex paths in a dielectric material and supplying a voltage of at least 50,000 volts to the region of said paths and enclosing said dielectric material in a grounded housing completely around said dielectric material in at least one dimension.

* * * * *